United States Patent [19]

Dreier

[11] 4,212,574
[45] Jul. 15, 1980

[54] FORAGE UNLOADER DOOR AND LATCH ASSEMBLY

[76] Inventor: Melvin E. Dreier, Dumont, Iowa 50625

[21] Appl. No.: 956,584

[22] Filed: Nov. 1, 1978

[51] Int. Cl.² .................. B60P 1/40; A01F 21/00; A01C 3/06
[52] U.S. Cl. ................... 414/502; 239/651; 239/689; 180/286; 241/194; 241/37.5; 49/385
[58] Field of Search ............... 414/501, 502; 180/286, 180/271; 239/651, 658, 689, 670, 650; 222/627; 172/45; 241/194, 37.5, 222, 101.7, 186 R; 49/385; 220/336

[56] References Cited

U.S. PATENT DOCUMENTS

| 3,176,995 | 4/1965  | Ferris    | 241/194 X |
| 3,474,926 | 10/1969 | Skromme   | 414/502   |
| 3,640,473 | 2/1972  | Webb et al. | 239/658 |
| 3,764,077 | 10/1973 | McCallum  | 222/627 X |
| 3,794,198 | 2/1974  | Buchele et al. | 414/502 |

Primary Examiner—Robert G. Sheridan
Assistant Examiner—Edmond G. Rishell, Jr.
Attorney, Agent, or Firm—Morton S. Adler

[57] ABSTRACT

A material unloader for forage or the like includes a closed box-type body having interior unloading mechanism for delivering material to an exterior chute and has at least one, and preferably two, latchable closures for providing access to the body interior. The unloading mechanism is designed for connection to a source of power exteriorly of the body and locking apparatus on the closures is arranged for purposes of safety so that the unloading mechanism must be rendered inoperable to effect the opening of any closure and cannot be made operable while any closure is open and affording access to such mechanism. This unloader may be mounted on a wheeled chassis for towing or mounted on a self-propelled vehicle.

9 Claims, 18 Drawing Figures

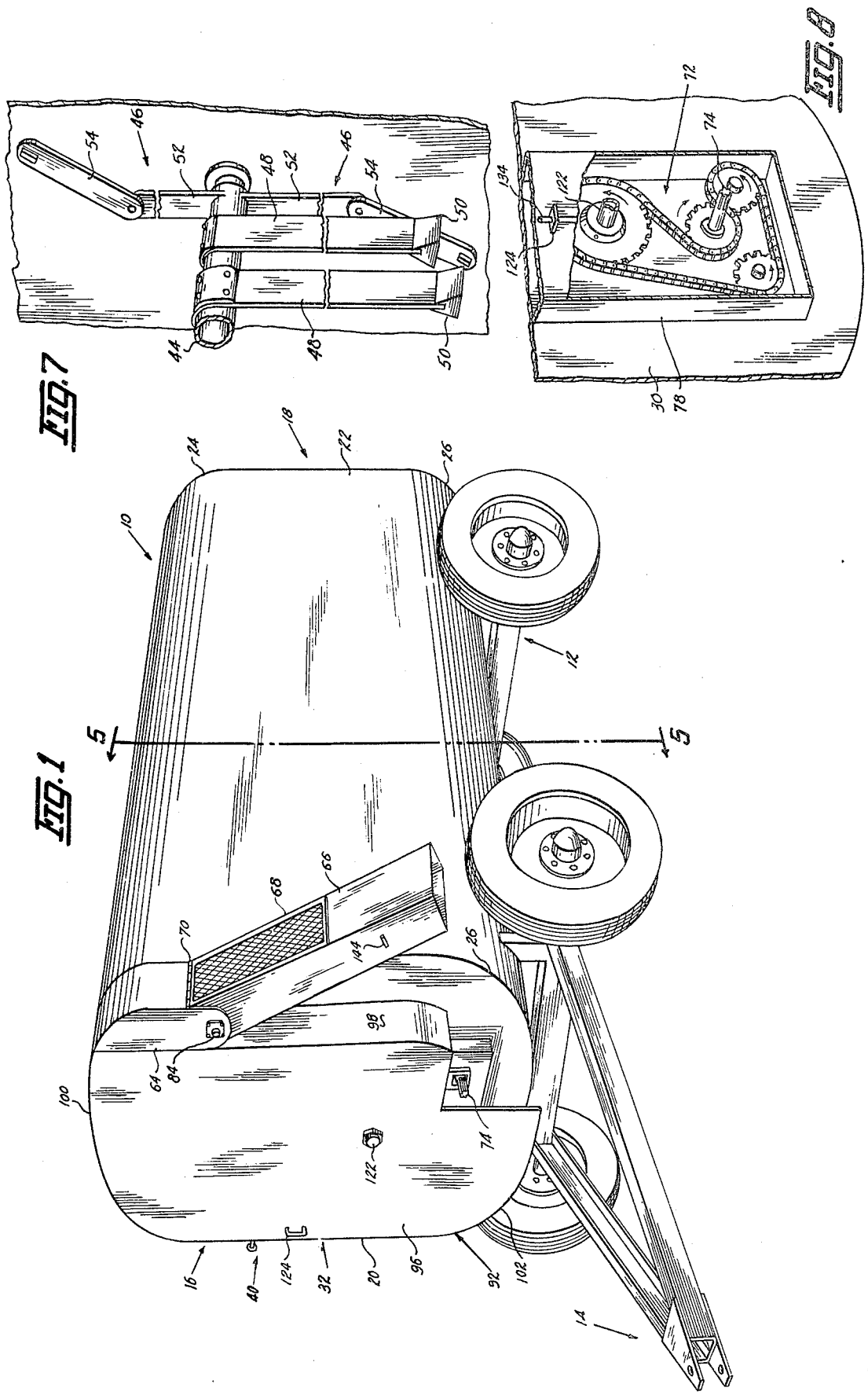

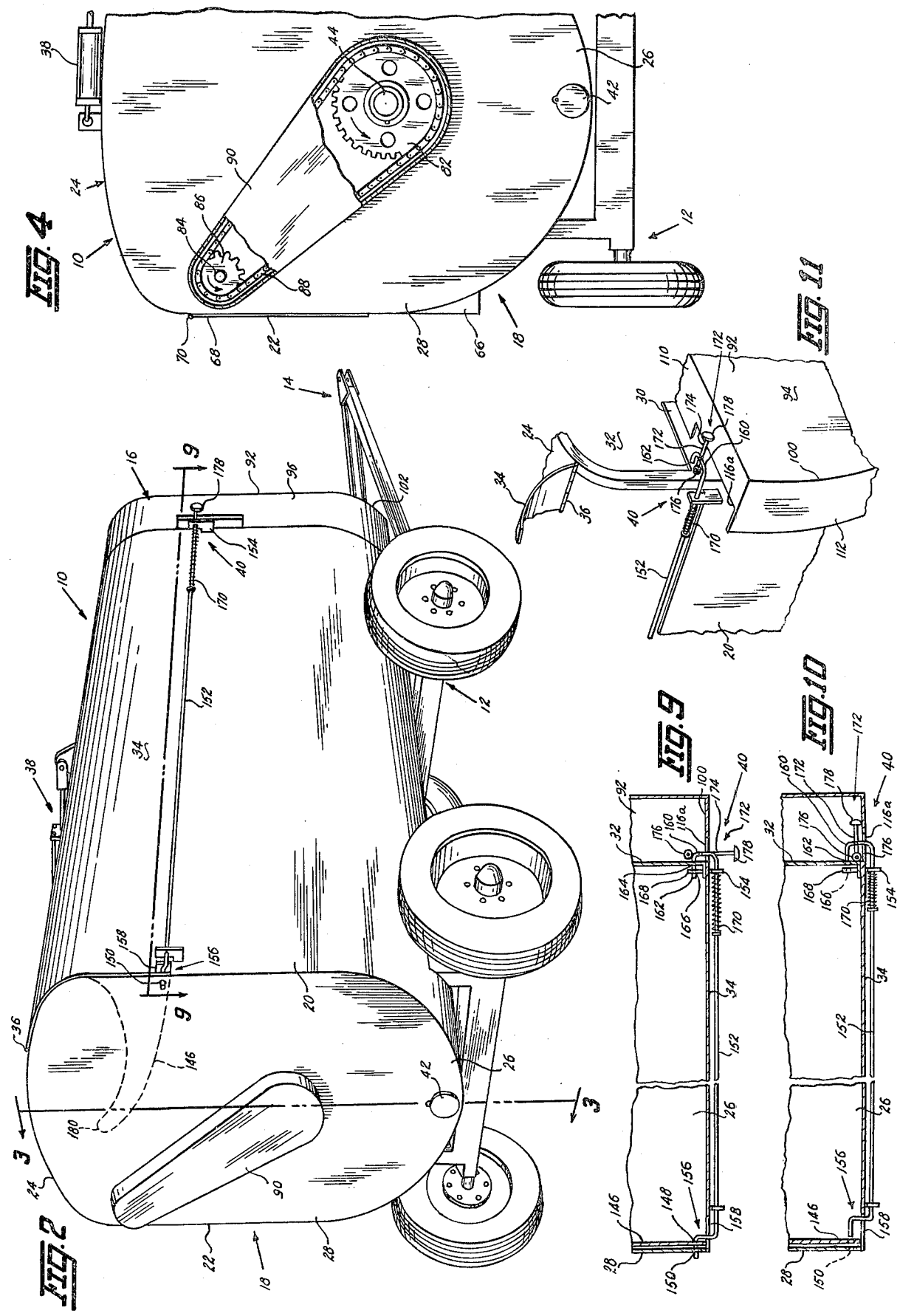

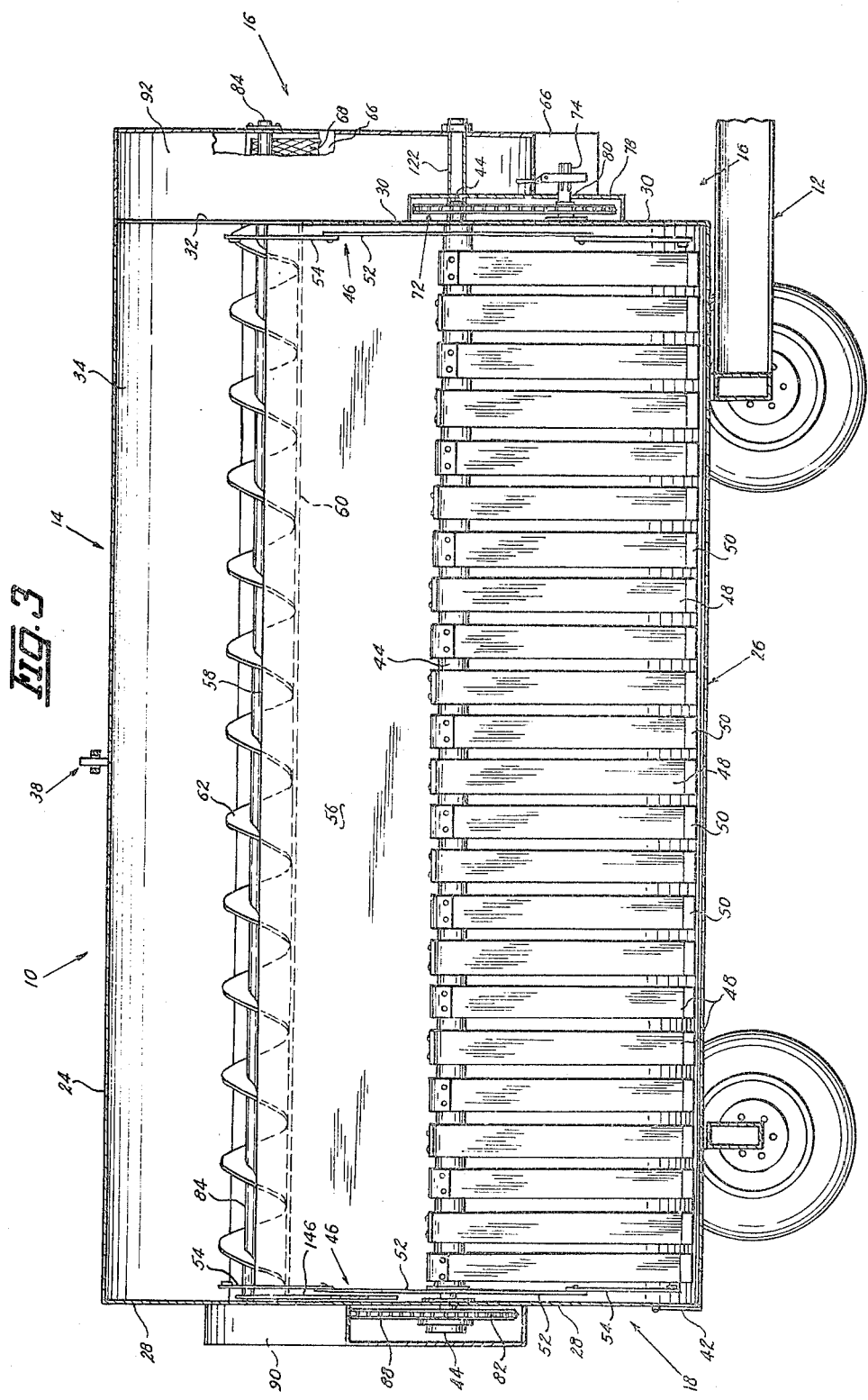

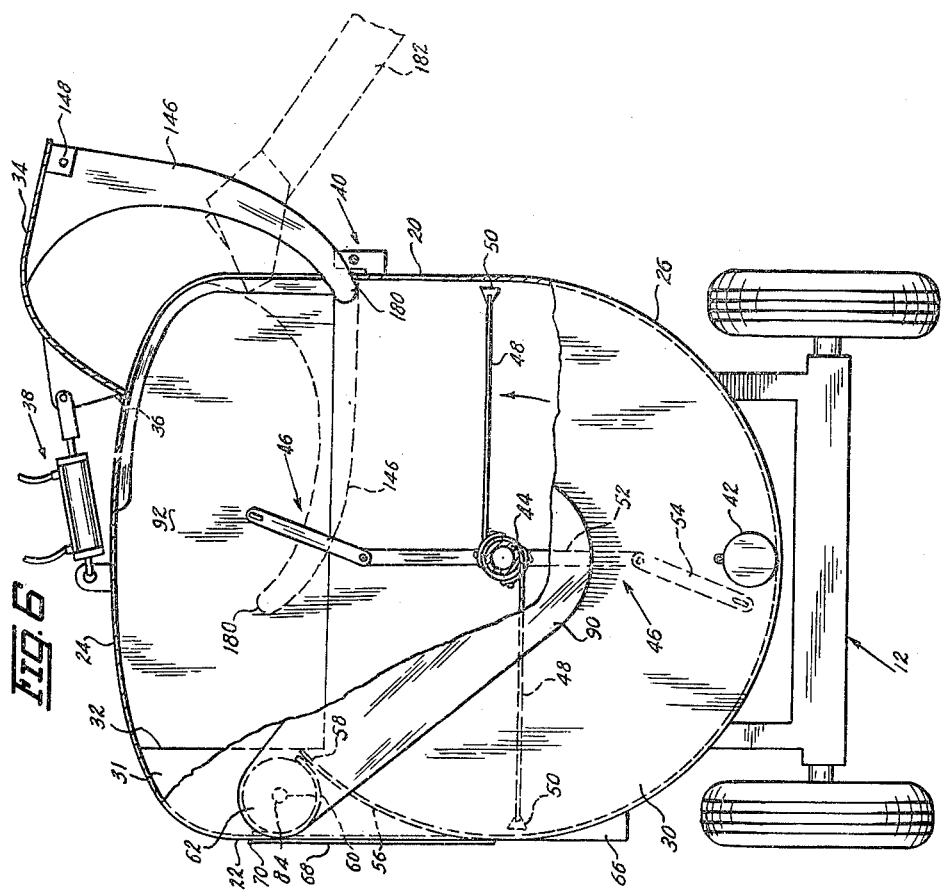
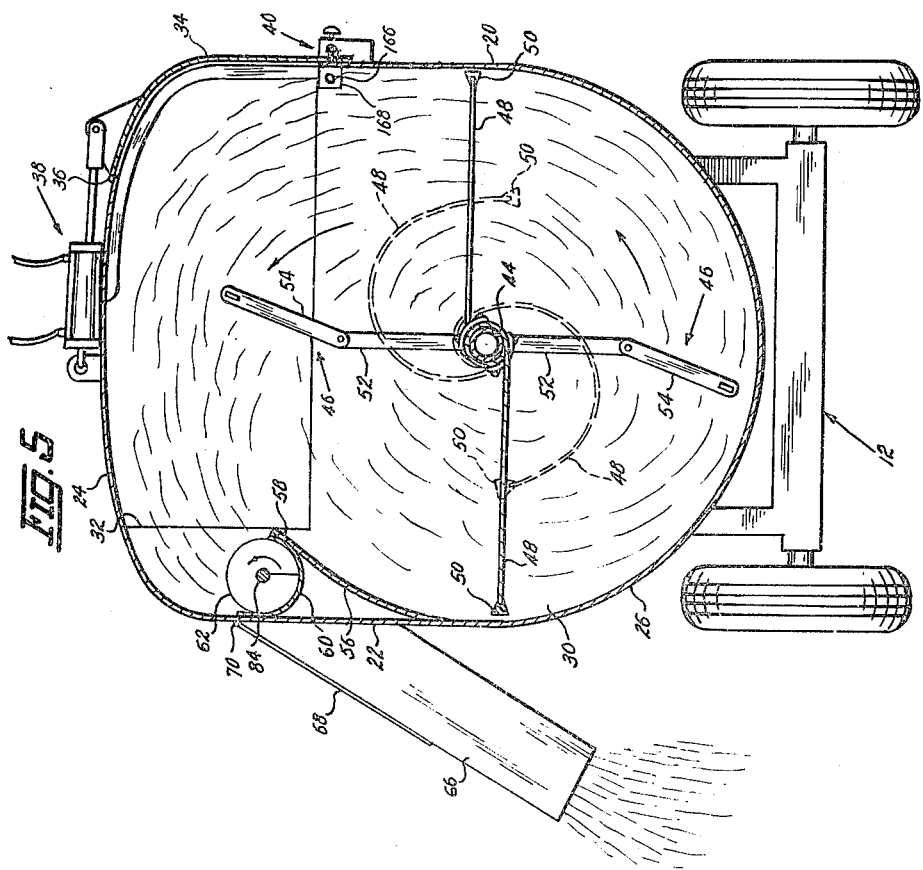

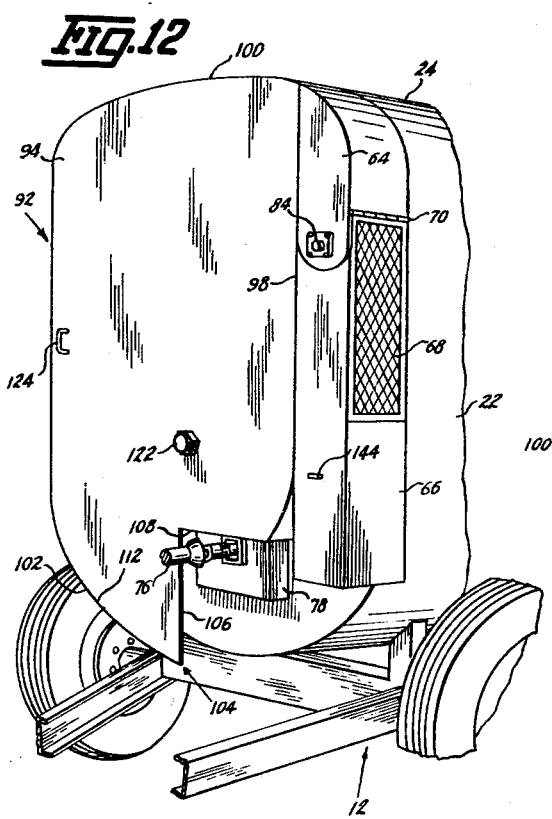
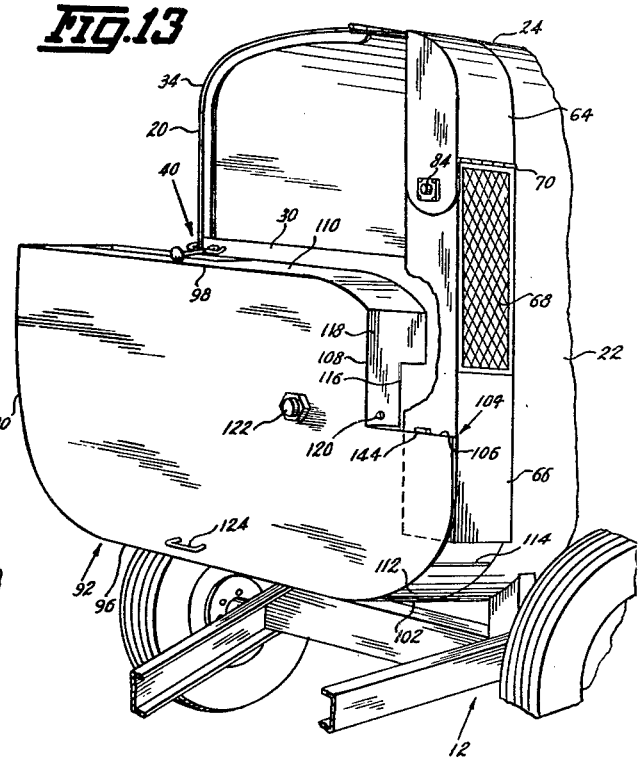
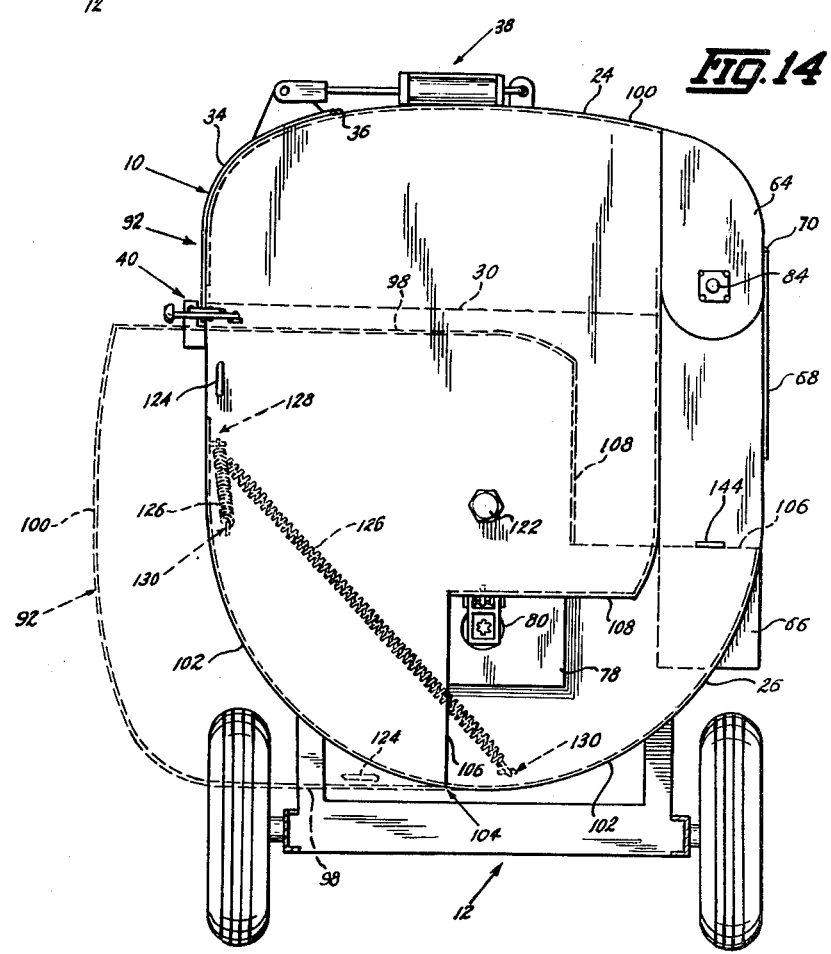

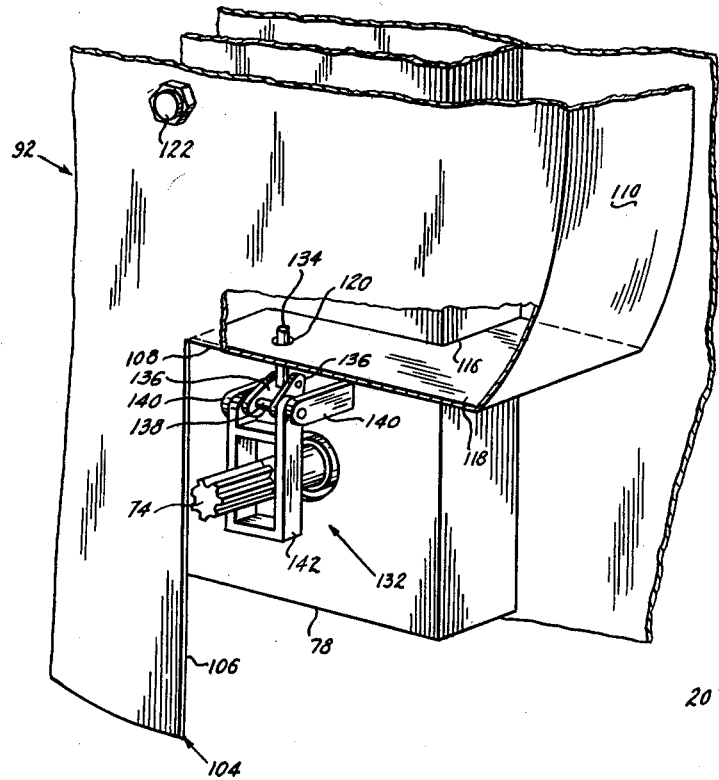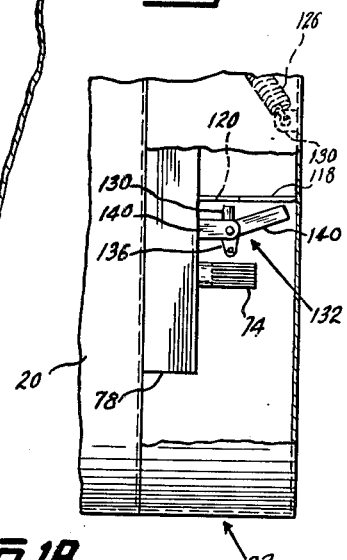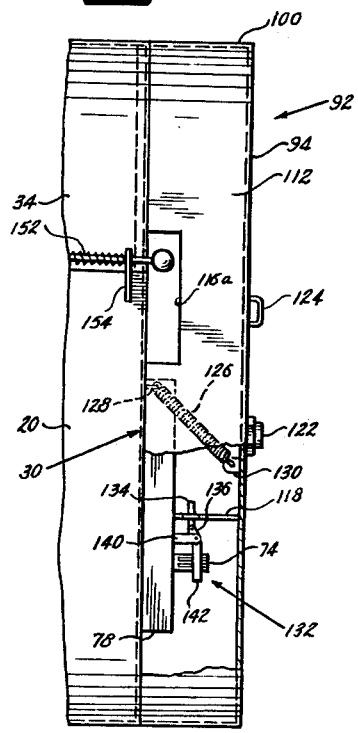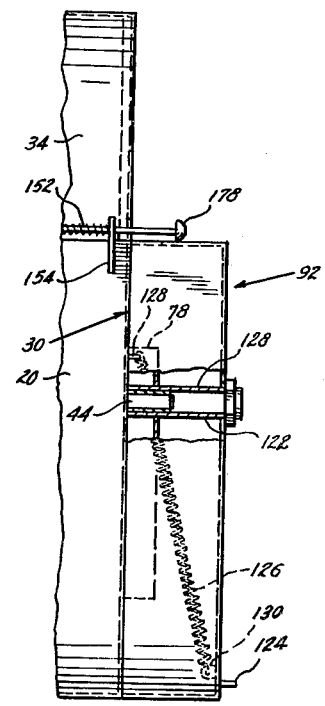

FORAGE UNLOADER DOOR AND LATCH ASSEMBLY

BACKGROUND OF THE INVENTION

This invention relates to improvements in material unloaders and more particularly to improved safety features designed to eliminate injury to the operator by the unloading mechanism employed.

No particular form of unloading mechanism is required for purposes of the safety features of this invention but since this unloader is intended primarily for unloading silage and the like, although not limited thereto, I have preferably utilized a flail and auger device of a type generally well known in manure spreaders as disclosed in U.S. Pat. No. 3,474,926 and which I have modified as will appear.

One of the important objects of this invention relates to safeguards for the operator wherein the unloading mechanism is rendered incapable of operation whenever the unloader is being loaded with material for distribution or access to such mechanism is necessary for servicing or repair. This is a substantial improvement over present type material unloaders such as manure spreaders in use and the like where open sides or other openings in the unloader provide ready access to the unloading mechanism whether it is operating or not. This can and has been a source of injury due to the fact while present type of unloaders have means for shutting down the unloading mechanism, this is only an available option requiring a deliberate act by the operator that is not always exercised so that access to operating mechanism is possible and has the ever present potential for injury.

More particularly, it is an object of this invention to provide an unloader of the above class with a closed body having a latchable closure providing access to the interior for loading material or servicing an interiorly mounted unloading mechanism and wherein such mechanism can be operated only when the closure is in closed position.

SUMMARY OF THE INVENTION

The present invention includes a closed box or wagon type body preferably on a mobile chassis and designed to be pulled by a prime mover such as a tractor having a power takeoff as is well known. This unloader has special utility for unloading forage which will normally be blown into the interior through either a side or front opening. A flail device within the unloader delivers the forage to an interior auger that in turn delivers it to a swingable dispensing chute. Power to operate the flail and auger is obtained by a drive connection means to the power takeoff of the tractor. The front and side openings in the unloader are provided with respective doors or closures that have an interrelated locking arrangement with each other so that the side door or closure can be opened only when the front door is opened and the front door cannot be closed when the side door is opened. The front closure is designed to require disconnection of the drive connection means to the power takeoff before it can be opened and the closed position of the front closure requires that the side door be locked whereby this arrangement provides that whenever access to the unloading mechanism is possible through either the side or front closures for whatever reason such as loading or servicing, the unloading mechanism, being disconnected from the power takeoff, is incapable of operation. The operator is thus not provided with a choice to disconnect the unloading mechanism or not if access to such apparatus is necessary since such access cannot be obtained until the mechanism is disconnected.

BRIEF DESCRIPTION OF THE DRAWINGS

FIG. 1 is a perspective view of this invention showing the front and unloading side thereof, FIG. 2 is a perspective view thereof showing the rear and the side opposite to that shown in FIG. 1, FIG. 3 is a cross sectional view taken on the line 3—3 of FIG. 2 with a portion of the front door broken away to show a portion of the dispensing chute, FIG. 4 is a fragmentary rear elevational view of this box body with portions of the hood covering the chain drive between the flail and auger shafts broken away to more clearly illustrate the same, FIG. 5 is a cross sectional view taken on the line 5—5 of FIG. 1 showing the side door of the box body in closed and locked position and the discharge chute in operating position, FIG. 6 is a view similar to FIG. 5 but showing the side door in solid lines in open position and the discharge chute in non-operating position, FIG. 7 is a fragmenatary perspective view of one end of the flail device showing the flexible flail belts and the rigid linked starter flail bar used with this invention, FIG. 8 is a perspective view of the drive mechanism on the box body for connection to the power takeoff of a tractor, FIG. 9 is a fragmentary cross sectional view taken from the line 9—9 of FIG. 2 showing the locking or latching mechanism for the side door in locked or latched position and its relative position to the closed position of the front door, FIG. 10 is a view similar to FIG. 9 but showing the locking or latching mechanism and handle therefor in unlocked or unlatched position and relative to the open position of the front door, FIG. 11 is a fragmentary perspective view of the lock or latch handle in FIG. 10 in unlocked or unlatched position relative to the open positions of the side door and the front door to prevent movement of the front door to closed position, FIG. 12 is a perspective view of the front of the box body showing the chute in non-operating position and showing the front door in locked or latched position with the drive connection accessible for attachment to the power takeoff of a tractor, FIG. 13 is a view similar to FIG. 12 but showing the front door in open position, FIG. 14 is a front elevational view of this unloader showing the front door closed in solid lines and open in broken lines, FIG. 15 is an enlarged perspective view of the lower portion of the front door in latched or locked position and partially broken away to illustrate the locking or latching assembly, FIG. 16 is a fragmentary elevational view showing the latch of FIG. 15 in unlocked position, FIG. 17 is a side elevational view of the front door, partly in section, showing said door closed and locked, and FIG. 18 is a view similar to FIG. 17 but showing the front door opened and unlocked or unlatched.

DESCRIPTION OF THE PREFERRED EMBODIMENTS

Referring to the drawings, this unloader comprises a box type body, preferably elongated, and designated generally by the numeral 10 as best seen in FIGS. 1 and 2. It is preferably suitably mounted to a wheeled transport frame or trailer 12 having a tongue assembly 14 for attachment to a tractor equipped with a power takeoff (not shown) in a well known manner. It will also be understood that, if desired, body 10 can be mounted on a self-propelled vehicle but the manner of mounting is a matter of choice.

For purposes of description, body 10 has the front end 16 and rear end 18 and includes spaced sidewalls 20,22, rounded top 24, a rounded bottom 26 and a closed rear wall 28. A wall 30 covers the lower half of front 16 and extends in a narrow width 31 adjacent side 22 to top 24 with the remaining portion of front 16 being open as at 32. A side door 34 serves as the upper portion of side 20 and is curved to provide the corresponding portion of top 24 as seen in FIG. 2. Door 34 is hinged 36 to the top of box 10 and is designed to be raised and lowered by any suitable power assist means shown here in the form of a hydraulic jack 38 mounted on top 24 and attachable to the hydraulic system of a tractor or the like (not shown) in a well known manner. A locking or latching assembly 40 for door 34, which is an important part of this invention, is interrelated to another locking assembly that will later appear and thus a detailed description of assembly 40 will be better understood if made later herein. A cleanout door 42 is provided in the bottom center of rear wall 28.

A shaft 44 extends longitudinally within box 10 and is suitably journalled to the rear and front walls 28,30 as best seen in FIG. 3. A flail assembly carried by shaft 44 comprises the like starter elements 46 at respective ends of shaft 44 and adjacent the respective walls 28 and 30. Intermediate elements 46, a plurality of flexible belts 48 are secured at one end to shaft 44 in longitudinal spaced relationship thereon. The other ends of belts 48 are provided with a shoe 50 of rubber or the like and the overall lengths of elements 46 and 48 are such that they will revolve within the confines of box 10 as will later be referred to in more detail. Starter elements 46 comprise a rigid bar 52 attached at its center to shaft 44 and includes rigid but pivotal links 54 at each end. No invention is claimed in the flail assembly per se as such form of unloading mechanism is well known on manure spreader devices. However, it can be noted that where chain elements have been conventionally used in flail devices, I have utilized the flexible belts 48 for reasons that will become apparent as this description proceeds.

A curved baffle or shield 56 as best seen in FIGS. 5 and 6 extends longitudinally of the interior of box 10 relative to side 22. The curvature of such shield is in effect a continuation of the curvature of bottom 26 and extends to point 58 on the inner edge of wall 31. Intermediate point 58 and wall 22, an auger trough 60 and auger 62 are suitably mounted to extend between the rear and front walls 28,31. The discharge end of auger 62 communicates with a chute head 64 mounted at the juncture of wall 31 and side 22 and swingably depending from head 64 is the elongated discharge chute 66 in which there is provided the door member 68 hinged as at 70 and of grid construction which affords visible inspection of the chute interior and access thereto when necessary.

A drive connection assembly 72 for operable connection to shaft 44 in any suitable well known arrangement is mounted to the outer side of the front wall 30 (FIG. 8) and includes the splined shaft 74 for connection to a couplement element 76 from the power takeoff of a tractor (not shown) in a well known manner. A protective box-like enclosure 78 mounted to the wall 30 is provided for drive assembly 72 and includes the aperture 80 for shaft 74.

Shaft 44 projects slightly from the rear wall 28 (FIG. 4) to support gear 82 and similarly, shaft 84 for auger 62 supports gear 86 with such gears 82, 86 being connected by the chain drive 88 and enclosed by the protective hood or cover 90.

A door or closure 92 is provided at the front end 16 relative to opening 32 and is designed to be movable from its closed position seen in FIG. 1, 12 to its open position as seen in FIG. 13. Door 92, as best seen in FIGS. 12-14, is generally complementary in outline to the front of body 10. Such door includes the elongated plate 94 having parallel sides 96, 98 corresponding respectively to body side 20 and the inner edge of portion 31 defining opening 32, and the arcuate top 100 complementary in outline to top 24. The lower portion of side 96 is arcuate as at 102 to correspond to bottom 26 and terminates at point 104 where a notch is formed in plate 94 and defined by the right angle edges 106, 108 with edge 108 extending to the lower end of plate side 98. Door 92 is generally of a shallow box shape where plate 94 is bordered by the wall 110 along side 98 and wall 112 (FIG. 17) across top 100 and along side 96 to terminate short of point 104 at edge 114 to define the bottom of door 92 as best seen in FIG. 13. Walls 110 and 112 are provided with opposed notches 116, 116a (FIGS. 11,13) near top 100 and edge 108 of plate 94 is provided with the notched wall 118 communicating with wall 110. Wall 118 is provided with the hole 120.

Thus far described, door 92 is mounted on front end 16 relative to wall 30 and opening 32 (FIGS. 12,13) by means of the hollow shaft 122 suitably rotatably journalled over shaft 44 which protrudes from box cover 78 as best seen in FIG. 18. By this arrangement, door 92 can be manually rotated on shaft 122 from closed position, FIG. 12, to open position, FIG. 13, and vice versa. Handle 124 is provided on door 92 to facilitate its respective movements and since door 92 will be relatively heavy, a counterbalance spring 126 is secured at one end 128 to wall 30 and at its other end to the inner side of plate 94 at 130 as shown. The box shape of door 92 permits it to enclose the box cover 78 and in movement of door 92 to and from open and closed positions, edge 106 on plate 94 intersects the axial line of shaft 74 as will later be referred to in more detail.

A locking or latching assembly 132 (FIG. 15) is provided for door 92 and, together with locking or latching assembly 40 for door 34 previously mentioned only generally, will now be described.

The primary purpose of assembly 132 is to latch or secure door 92 against vibration when in closed position and whether assembly 132 is latched or unlatched as will appear, the closed position of door 92 permits assembly 72 to be either connected or disconnected from its power source through element 76. However, the design and movement of door 92 is such that before door 92 can be moved away from its closed position to open position where it intersects the axial line of element 76, such element must be disconnected so that the operator has no other options for exposing opening 32.

Once this is done and with door 92 open, it encloses shaft 74 so that drive assembly 72 cannot be reconnected to its power source until door 92 is closed. Preferably, assembly 132 will be latched or locked when door 92 is closed and as an added safety feature, assembly 132 is preferably interrelated to the connection and disconnection of element 76. At the same time, lock or latch assembly 40 is designed to permit door 34 to be unlocked and thus openable only when door 92 is open and with door 34 opened, assembly 40 acts to prevent door 92 from being moved to closed position. These arrangements are accomplished as follows with reference being made first to FIG. 15 for a description of lock or latch assembly 132.

A vertically movable lock rod 134 is secured at its lower end between one end of a pair of elongated spaced links 136 with the other end of said links secured to shaft 138 that is rotatably journalled in spaced ears 140 on box 78 whereby the upper end of rod 134 can be moved upwardly through hole 120 in wall 118 on plate 94. Also secured to shaft 138 intermediate ears 140 and depending therefrom is the handle 142 in the form of an open-center bar frame capable of embracing shaft 74 as shown. When handle 142 is in its downwardmost position seen in FIG. 15, rod 134 is elevated into locking relationship with wall 118 on door 92 and with door 92 locked, FIG. 15, shaft 74 can be connected to coupling 76 through the notch portion of plate 94 as seen in FIG. 12. To raise handle 142 and thus unlock door 92, coupling 76 must be removed since in coupled position, element 76 prevents the movement of handle 142 to unlocked position. Once unlocked, door 92 can be manually rotated until edge 106 abuts stop 144 (FIG. 14) on wall 30 to define the open position of door 92 seen in FIG. 13. In this position, plate 94 intersects the axial line of shaft 74 and in effect encloses such shaft so that it cannot be reconnected to coupling 76 until door 92 is returned to closed position.

Reference is now made more particularly to FIGS. 2, 6 and 9-11 for a description of locking assembly 40 on side door 34 and its interrelation to the locked and unlocked positions of the front door 92 as described.

At the end of door 34 adjacent the rear wall 28, there is provided the arcuate side plate 146 which moves adjacent the inside of wall 28 and with its position when door 34 is open being shown in solid lines in FIG. 6 and its position when door 34 is closed being shown in broken lines in FIGS. 2 and 6. A lock rod hole 148 is located in plate 146 near the lower rear corner of door 34 as seen in FIGS. 6,9 and a hole 150 is provided in wall 28 which registers with hole 148 when door 34 is closed. An elongated locking rod 152 extends the length of box 10 in close spaced relationship to the door 34 and is supported near front end 16 by support bracket 154 on door 34. The rearward end of rod 152 is offset as at 156 so as to extend into box 10 through the notched cutout 158 in door 34 where the free end of offset 156 rests in hole 148 of plate 146 and is capable of engaging wall 28 through hole 150 as shown.

The forward end of rod 152 extends forwardly of wall 30 in a U-shaped end 160 with the free end 162 of the U portion 160 disposed toward wall 30 for registration with a lock hole 164 therein and a registering lock hole 166 in a lock plate 168 mounted to the inner side of door 34 as best seen in FIGS. 9 and 10. Rod 152 is normally urged to its rearward or locked position shown in FIG. 9 by spring means 170.

Means for moving rod 152 relative to its locked and unlocked positions is provided on U end 160 by handle 172 which comprises the elongated rod 174 pivotally secured intermediate its ends to the closed end of U portion 160 with one end of rod 174 provided with a roller wheel 176 designed to engage and ride against wall 30. By this arrangement, rod 174 is movable parallel to wall 30 (FIG. 9) and perpendicularly therefrom (FIG. 10) in which latter position handle end 178 of rod 174 projects forwardly as shown.

In the locked position of assembly 40, rod 174 is parallel to wall 30 (FIG. 9) and planar with the closed end of portion 160 so that spring means 170 urges rod 152 to its rearwardmost position for locking door 34 to walls 28 and 30 when such door is in closed position. By rotating handle 172 to the position in FIG. 11, it will be noted that wheel 176 rides against wall 30 as rod 174 pivots on U portion 160 and the length of rod 174 between wheel 176 and the pivot point on U portion 160 is such that rod 152 is pulled forwardly disengaging itself from walls 28 and 30 so that door 34 can be opened.

In accordance with the construction and operation of locking assembly 40, lock handle 172 of such assembly must be in locked position to either open or close door 92 and the closed position of door 92 will prevent movement of handle 172 as follows. As door 92 is rotated to its open position, (FIGS. 13,18), notch 116a is wide enough to provide clearance past the locked position of handle 172 but shallow enough so that handle 172 cannot be moved to unlocked position because of wall 112. With door 92 opened, wall 110 will be horizontal and disposed just below the plane of handle 172 which can then be moved to its unlocked position seen in FIG. 11 where handle 172 extends across the notch 116a over wall 110 to provide a barrier against moving such door to closed position while door 34 is open.

With door 92 open and lock handle 172 in unlocked position, the opening of door 34 by jack means 38 or otherwise positions side plate 146 as seen in FIG. 6 where the end 180 of plate 146 comes to rest in juxtaposition with hole 150 in rear wall 28 thereby preventing rearward or locking movement of rod 152 and thus assures that handle 172 cannot be moved out of its open position while door 34 is open and at the same time positioning handle 172 relative to the open position of door 92 as described so that door 92 cannot be closed while door 34 is open.

In operation and use, box 10 is loaded with forage either through the front opening 32 or the side door 34 in any suitable manner and usually by a blower device represented for illustration at 182 in FIG. 6. This, of course, requires the opening of either door 92 or 34, or both, exposing the interior unloading flail and auger mechanism to easy access and which can be the cause of serious injury to personnel who might come in contact with it if it should be operating or could be accidentally started up. One of the important features of this invention is to eliminate the possibility of such injuries which has been accomplished by the design and operation of door 92 in cooperation with assembly 40 as described. Accordingly, it will be appreciated that door 34 cannot be opened until door 92 is opened and door 92 cannot be opened without disconnecting coupling 76 from the drive connection 72. In this regard, the operator does not have the option of merely shutting down the unloading mechanism by turning a switch or not but must actually disconnect the same from the power source.

Once door 34 is opened, door 92 cannot be moved to closed position until door 34 is closed so as to keep the unloading mechanism inoperable while either door is opened.

With box 10 loaded, both doors 34 and 92 closed and locked and the connection to the power takeoff established, the rotation of shaft 44 operates the flail structure in a well known manner wherein the belts 48 first wind around shaft 44 as the starters 52, 54 loosen and open the material permitting the belts to unwind and throw the material onto the auger 62 for delivery to chute 66. Because box 10 is designed more particularly for unloading silage and forage which is relatively soft, the flexible belts 48 are adequate and are used in place of chain flails normally found in manure spreaders where chunks and frozen pieces are often found and require flails of strong chain material. It should be noted that auger 62 cannot be overloaded as excess material thereon will merely fall back onto the flail structure.

Accordingly, in view of the foregoing, it is thought a full understanding of the construction and operation of this invention will be had and the advantages of the same will be appreciated.

I claim:

1. A material unloader, comprising:
   a closed material containing body provided with an opening for access to the interior thereof,
   material unloading mechanism mounted within said body and arranged for delivering material to a point exteriorly thereof,
   a drive connection means mounted on said body and operatively connected to said unloading mechanism,
   a drive shaft on said drive connection means adapted for connection to a source of power,
   a door, means for rotatably mounting said door on said body for respective movements to closed and open positions relative to said opening,
   a latch assembly to selectively latch and unlatch said door relative to said body when said door is in closed position,
   said door being designed for providing access to said drive shaft when said door is closed for connection of said drive shaft to a source of power,
   the rotation of said door to open position causing a portion of said door to intersect a longitudinal plane passing through the connection of said drive shaft to its source of power whereby said drive shaft must be disconnected from its source of power in order to open said door, and
   the open position of said door disposed to enclose said drive shaft so that it cannot be connected to its source of power until said door is moved to closed position.

2. A material unloader as defined in claim 1, including:
   a second door operatively mounted on said body and oriented in a different direction than said first mentioned door to provide a second access opening to the interior of the body,
   a lock assembly on said body operable to selectively lock and unlock said second door when in closed position,
   movable means on said lock assembly for effecting its respective locked and unlocked positions wherein the respective paths of movement of said movable means for each position of said lock assembly intersect a transverse path of movement of said first mentioned door,
   said first mentioned door being fully closeable free of obstruction by said movable means only when said movable means is in locked position wherein said first mentioned door engages said movable means to prevent movement of said movable means to unlocked position, and
   upon the opening of said first mentioned door said movable means being movable to unlocked position disposing it in the path of movement of said first mentioned door whereby said door cannot be moved to closed position until said movable means has been moved to locked position.

3. A material unloader as defined in claim 2 including:
   said second door being substantially greater in size than said first mentioned door, and
   power means on said body for moving said second door to respective open and closed positions.

4. A material unloader as defined in claim 2, including:
   a stop member on said second door adapted to act against said locking assembly only when said second door is opened, and
   the open position of said second door positioning said stop member to obstruct the movement of said locking assembly to locked position and correspondingly immobilizing said movable means at a point traversing the path of movement of said first mentioned door whereby said stop member prevents said movable means from being moved to locked position when said second door is open and said first mentioned door cannot be moved to closed position until said second door is closed and said movable means is returned to locked position.

5. A material unloader as defined in claim 1, including:
   said body having respective front and rear ends, oppositely disposed sides, a bottom and a top,
   said unloading mechanism comprising:
   a rotatable shaft suitably mounted to and within said body between said front and rear ends and extending parallel to the longitudinal axis of the body and operatively attached to said drive connection means,
   a plurality of flexible belt flail members each secured at one end to said shaft and disposed in longitudinal spaced relationship thereon intermediate its ends,
   a respective starter flail member of rigid pivotally connected links at each end of said shaft,
   an auger means mounted within said body in parallel offset relation to said shaft and at an elevated plane relative thereto,
   the rotation of said shaft causing said flail members to rotate in an extended position to engage material in said body and deliver it to said auger means, and
   said auger means adapted to deliver said material to a point exteriorly of said body.

6. A material unloader as defined in claim 5 including a material discharge chute movably mounted to the exterior of said body and in communication with one end of said auger means.

7. A material unloader, comprising:
   a closed material containing body provided with an opening for access to the interior thereof, a door operatively mounted on said body for respective movements to closed and open position relative to said opening, material unloading mechanism mounted within said body and arranged for delivering material to a point exteriorly thereof, a drive connection means mounted on said body and operatively connected to said unloading mechanism, a drive shaft on said drive connection means adapted for connection to a source of power, a lock assembly including first and second movable lock assembly members operatively connected together for simultaneous movement and mounted on said body adjacent said door, said first member being selectively movable in one direction to locked position in a path intersecting a transverse plane passing through the connection of said drive shaft to its source of power which simultaneously moves said second member into locking engagement with said door and for selectively moving said first member in the opposite direction to unlocked position in a reverse path intersecting said plane of connection which simultaneously moves said second member out of said locking engagement, and said drive shaft being free of obstruction by said first member for connection to a source of power when said first member is in locked position whereby the connection of said drive shaft to a source of power serves to prevent the movement of said first member to unlocked position and said drive shaft must be disconnected before said first member can be moved to unlocked position.

8. A material unloader as defined in claim 7, including:

a second door movably mounted on said body and oriented in a different direction than said first mentioned door to provide a second access opening to the interior thereof, a second lock assembly on said body including latch means movable into and out of locked and unlocked position with said second door when it is closed and a latch operating means operatively associated with said latch means for moving the same, the respective movements of said latch operating means to effect the locked and unlocked positions of said latch means being in respective opposed directions intersecting the path of movement of said first mentioned door to and from open and closed positions, said first mentioned door being fully closeable free of obstruction by said latch operating means only when said latch operating means is in locked position wherein said first mentioned door engages said latch operating means to prevent movement of said latch operating means to unlocked position, and upon opening of said first mentioned door said latch operating means being movable to unlocked position disposing it in the path of movement of said first mentioned door whereby said door cannot be moved to closed position until said latch operating means has been moved to locked position.

9. A material unloader as defined in claim 8, including:

a stop member on said second door adapted to act against said latch means only when said door is opened, and the open position of said second door positioning said stop member to obstruct the movement of said latch means to locked position and corresponding immobilizing said latch operating means in its unlocked position relative to said first mentioned door whereby said latch means cannot be moved to locked position while said second door is opened by reason of said stop member and correspondingly said first mentioned door cannot be moved to closed position until said second door is closed and said latch operating means is moved to locked position.

* * * * *